(12) United States Patent
Inoue et al.

(10) Patent No.: US 8,207,386 B2
(45) Date of Patent: Jun. 26, 2012

(54) RUBBER-LIKE ARTICLES AND RUBBER-LIKE MATERIAL-CONTAINING ARTICLES

(75) Inventors: Shinichi Inoue, Tokoname (JP); Tomohiro Nishio, Yamatokohriyama (JP); Haruhiko Ito, Yamatokohriyama (JP); Kenichi Horiuchi, Yamatokohriyama (JP); Toshiaki Kasazaki, Yamatokohriyama (JP)

(73) Assignees: Nitta Corporation, Osaka (JP); Shinichi Inoue, Aichi (JP)

( * ) Notice: Subject to any disclaimer, the term of this patent is extended or adjusted under 35 U.S.C. 154(b) by 0 days.

(21) Appl. No.: 10/582,000

(22) PCT Filed: Dec. 1, 2004

(86) PCT No.: PCT/JP2004/018237
§ 371 (c)(1),
(2), (4) Date: Jun. 7, 2006

(87) PCT Pub. No.: WO2005/056612
PCT Pub. Date: Jun. 23, 2005

(65) Prior Publication Data
US 2007/0117931 A1 May 24, 2007

(30) Foreign Application Priority Data

Dec. 8, 2003 (JP) ................................. 2003-409476
Aug. 26, 2004 (JP) ................................. 2004-26954
Nov. 8, 2004 (JP) ................................. 2004-324229

(51) Int. Cl.
*C07C 5/02* (2006.01)
*C07C 5/03* (2006.01)
*C08F 210/00* (2006.01)
*C08L 9/00* (2006.01)
*C08L 47/00* (2006.01)

(52) U.S. Cl. .................. 585/275; 526/348; 525/237
(58) Field of Classification Search .................. 525/237
See application file for complete search history.

(56) References Cited

U.S. PATENT DOCUMENTS

| | | | | |
|---|---|---|---|---|
| 2,410,661 A | * | 11/1946 | Huppke ................... | 525/331.1 |
| 4,452,950 A | | 6/1984 | Wideman | |
| 4,914,160 A | | 4/1990 | Azizian | |
| 4,963,623 A | * | 10/1990 | Miller et al. ............... | 525/237 |
| 5,221,714 A | * | 6/1993 | Parker ....................... | 525/237 |
| 5,254,761 A | * | 10/1993 | Parker ....................... | 585/250 |
| 5,728,766 A | * | 3/1998 | Schauder et al. ............. | 524/496 |
| 5,902,889 A | * | 5/1999 | Wideman et al. ............. | 554/147 |
| 5,948,867 A | * | 9/1999 | Abhau ......................... | 525/194 |
| 5,981,628 A | * | 11/1999 | Takamoto et al. ............. | 523/201 |
| 5,998,512 A | * | 12/1999 | Schloman .................... | 524/17 |
| 6,031,009 A | * | 2/2000 | Gonzalez ..................... | 521/41 |
| 6,048,807 A | * | 4/2000 | Landi ........................ | 442/237 |
| 6,310,112 B1 | * | 10/2001 | Vo et al. .................... | 521/134 |
| 6,403,727 B1 | * | 6/2002 | Leube et al. ................. | 525/338 |
| 6,521,694 B2 | * | 2/2003 | Belt et al. .................. | 524/503 |
| 6,599,984 B1 | * | 7/2003 | Kawasaki et al. .............. | 525/237 |
| 6,756,451 B2 | * | 6/2004 | Belt et al. .................. | 525/338 |
| 7,144,959 B2 | * | 12/2006 | Kitahara ..................... | 525/237 |
| 7,148,292 B2 | * | 12/2006 | Pradel et al. ................ | 525/338 |
| 7,253,235 B2 | * | 8/2007 | Nishioka et al. .............. | 525/241 |
| 2003/0125475 A1 | * | 7/2003 | Sasagawa et al. .............. | 525/332.8 |
| 2003/0161975 A1 | * | 8/2003 | Lucas et al. ................. | 428/35.5 |
| 2004/0006178 A1 | * | 1/2004 | Nagahara et al. .............. | 525/70 |
| 2004/0063832 A1 | * | 4/2004 | Dzikowicz ................... | 524/257 |
| 2005/0288393 A1 | * | 12/2005 | Lean et al. .................. | 523/201 |

FOREIGN PATENT DOCUMENTS

| | | |
|---|---|---|
| JP | 49-17033 B | 4/1974 |
| JP | 59-161415 A | 9/1984 |
| JP | 61-19652 A | 1/1986 |
| JP | 02-20505 | 1/1990 |
| JP | 7-330964 A | 12/1995 |
| JP | 11-293058 A | 10/1999 |
| JP | 2004-143315 A | 5/2004 |

OTHER PUBLICATIONS

Nikhil K Singha et al., Journal of Applied Polymer Science, 1997, vol. 66, No. 9, pp. 1647-1652.
Tomohiro Nishio et al., The Society of Polymer Science, May 20, 2004, vol. 53, No. 1, p. 1671.
Tornohiro Nishio et al., The Society of Rubber Industry May 20, 2004, p. 39.
Japanese Office Action for Application 2003-409476 dated Apr. 6, 2010.

* cited by examiner

*Primary Examiner* — Liam Heincer
(74) *Attorney, Agent, or Firm* — Birch, Stewart, Kolasch & Birch, LLP

(57) ABSTRACT

Rubber-like or rubber-like-material-containing articles contain or are made from hydrogenated natural polyisoprenoids or modified products thereof. These rubber-like or rubber-like-material-containing articles include a rubber-like elastic article made from a hydrogenated natural polyisoprenoid or a modified product thereof. A polymer obtained by reacting a natural polyisoprenoid with hydrogen in a solvent in the presence of a hydrogenation catalyst, for example, can be used as the hydrogenated natural polyisoprenoid. The hydrogenated natural polyisoprenoid preferably has a degree of hydrogenation of 50% or more. The hydrogenated natural polyisoprenoid preferably has a weight-average molecular weight of $20 \times 10^4$ or more and a molecular-weight distribution of 2.0 or more.

The rubber-like or rubber-like-material-containing articles have excellent heat resistance and weather resistance, and are also excellent in view of resources and environment, because they use plant-derived raw materials.

5 Claims, No Drawings

RUBBER-LIKE ARTICLES AND RUBBER-LIKE MATERIAL-CONTAINING ARTICLES

TECHNICAL FIELD

The present invention relates typically to rubber-like articles or rubber-like-material-containing articles. Specifically, it relates to rubber-like elastic articles and production methods thereof, and more specifically, it relates to rubber-like elastic articles comprising hydrogenated natural polyisoprenoids, and production methods thereof. The hydrogenated natural polyisoprenoids have a modified structure as a result of hydrogenation of natural polyisoprenoids so as to have higher degrees of saturation. The rubber-like elastic articles are excellent in heat resistance, weather resistance, abrasion resistance, compression set (SET) properties, and low-temperature resistance and are useful as tires, tubes, medical-use rubber articles, latex dipped articles, rubber threads, belts, and rubber articles for seismic base isolation, vibration isolation, packing, and other industrial applications.

The present invention also relates to resin modifiers containing rubber-like polymers or modified products thereof, to resin compositions containing the resin modifiers, and to molded articles made from the resin compositions. More specifically, it relates to resin modifiers containing rubber-like polymers or modified products thereof having a modified structure as a result of hydrogenation of a natural polyisoprenoid so as to have higher degrees of saturation, to resin compositions containing resins and the resin modifiers, and to molded articles made from the resin compositions. The resin compositions can be used for molded resin articles requiring heat resistance, weather resistance, and impact resistance, including interior and exterior parts of automobiles, such as bumpers, dashboards or instrument panels, radiator grilles, and side mouldings; interior and exterior parts of household electrical appliances such as air conditioners and television sets; and interior and exterior parts of electronic equipment such as personal computers, digital cameras, and cellular mobile phones.

In addition, the present invention relates to modified latexes which are polymers having a modified structure as a result of hydrogenation of natural polyisoprenoid latices while keeping their latex state so as to have higher degrees of saturation, and to articles containing a hydrogenated natural polyisoprenoid or a modified product thereof, which are prepared by using the modified latices.

BACKGROUND ART

Natural polyisoprenoid is a generic name of polymers comprising an isoprene unit ($C_5H_8$), which are biologically synthesized by some plants and fungi and are typified by natural rubber collected from trees of *Hevea brasiliensis*. Such natural polyisoprenoids are produced by a number of plants and fungi including *Hevea brasiliensis, Ficus elastica, Eucommia ulmoides*, and fungi belonging to the genus *Lactarius*, such as *Lactarius volemus* (milk mushroom). However, almost none of natural polyisoprenoids other than natural rubber are industrially used. This is because they are insufficient when used as rubber, since most of polyisoprenoids have stereo structures less regular than that of natural rubber, have lower degrees of polymerization and insufficient molecular weights, and are economically difficult to produce in large quantities.

In contrast, the natural rubber can be stably supplied at low cost as a result of long-term investigations and efforts for improving its cultivation method and for stabilizing its quality, and is a rubber material that is adaptable to a widest variety of applications such as tires and other rubber articles. The natural rubber is excellent in rubber elasticity and strength but is insufficient in oil resistance, chemical resistance, heat resistance, and weather resistance. Consequently, it has a limited applicability and is not used as a "high-functional, multi-functional material", although it is an ecologically excellent material.

Rubber articles for industrial use, especially for use in engine compartments of automobiles, are used in hotter and hotter surroundings. These rubber articles must therefore have higher heat resistance. This is because the temperatures in engine compartments become higher with an increasing fuel economy and for complying with exhaust restrictions. There is an increasing move afoot to clean up the environment and to reduce carbon dioxide which is one of factors inducing global warming. Synthetic rubbers most of which are derived from petroleum raw materials are used in rubber and plastic industries. Carbon dioxide formed upon disposal of these synthetic rubbers becomes a big concern, and a variety of thermoplastic elastomers (TPEs) have been developed and used in recent years. Such TPEs can be reused without disposal. However, they cannot be reused permanently and are discarded ultimately. In addition, even TPEs are not always ideal rubber materials from the viewpoint of global environment, because they are derived from petroleum. Accordingly, plastics prepared from raw materials extracted from plants and having biodegradability have been developed.

Journal of Applied Polymer Science, 66, 1647-1652 (1997) describes a method for producing a hydrogenated product of natural rubber by reacting natural rubber with hydrogen in the presence of a rhodium complex catalyst in an organic solvent at a temperature of 100° C. The investigations in this document, however, are limited to a kinetic investigation of hydrogenation reaction and an investigation of thermal properties of polymer.

In contrast, general-purpose plastics such as polypropylenes (PPs) and polyethylenes (PEs) are widely used in various fields, because they have a wide variety of mechanical properties and moldability, show excellent cost performance, and can be easily recycled. Poly(lactic acid)s and other bioplastics prepared from vegetable materials such as sugarcane and corn have received attention from environmental viewpoints. However, demands have been made on these plastic articles to have further reduced weights and further higher impact resistance and rigidity.

Many attempts have been made to improve impact resistance of resins. Japanese Unexamined Patent Application Publication (JP-A) No. 07-330964, for example, proposes the addition of a styrenic elastomer to an amorphous resin, JP-A No. 11-293058 proposes the addition of an olefinic copolymer to a polypropylene, JP-A No. 61-19652 proposes the addition of a thermoplastic polyurethane to a polyacetal resin, and JP-A No. 2004-143315 proposes the addition of natural rubber to a poly(lactic acid). However, the addition of a styrenic elastomer results in insufficient weather resistance and unsuitable environmental friendliness due to the styrene component. The addition of an olefinic copolymer and that of a thermoplastic polyurethane result in insufficient low-temperature impact resistance. The addition of a natural rubber leads to insufficient weather resistance and impaired appearance of molded articles.

In addition to *Hevea brasiliensis*, many plants and fungi produce natural polyisoprenoids, as is described above. Effective usage of these plant-derived materials have been studied actively due to increased recent social demands on environmental friendliness. They are expected to be used more and more widely in future along with clarification of biosynthesis mechanisms of natural polyisoprenoids in plants and progress in biotechnologies.

Natural polyisoprenoid latices are collected from trees as latices and are used as raw materials for dipped articles such as gloves, catheters, and condoms, as well as for aqueous paints and coating agents. These latex articles, however, are also insufficient typically in heat resistance and weather resistance, and these properties stand in need of improvements.

DISCLOSURE OF INVENTION

An object of the present invention is to provide a rubber-like article or rubber-like-material-containing article that can be produced using a natural polyisoprenoid as raw material and has superior heat resistance and weather resistance.

Another object of the present invention is to provide a rubber-like elastic article that can be produced using a natural polyisoprenoid as raw material and has excellent mechanical properties and satisfactory heat resistance, low-temperature resistance, and weather resistance, and to provide a production method thereof.

Yet another object of the present invention is to provide a resin modifier that can impart excellent weather resistance, impact resistance, superior low-temperature impact resistance, and excellent appearance of molded articles to resins and uses environment-friendly plants as raw material.

Another object of the present invention is to provide a resin composition and a molded article thereof that are imparted with superior weather resistance, impact resistance, low-temperature impact resistance, or excellent appearance of molded articles without impairing original properties of the resin.

Yet another object of the present invention is to provide a modified latex that can be produced using a natural polyisoprenoid latex as raw material and is useful for producing an article having superior heat resistance and satisfactory weather resistance, and to provide an article obtained from the modified latex.

After intensive investigations to achieve the objects, the present inventors have found that the molding/forming of a polymer obtained by hydrogenation of a natural polyisoprenoid results in a rubber-like elastic article that has excellent mechanical properties and exhibits satisfactory heat resistance, low-temperature resistance and weather resistance. They have also found that the addition of a rubber-like polymer obtained by hydrogenation of a natural polyisoprenoid to a resin imparts to the resin satisfactory weather resistance, impact resistance and low-temperature impact resistance, and excellent appearance of molded articles. The present invention has been achieved based on these findings. Furthermore, they have found that an article obtained from a modified latex prepared by hydrogenation of a natural polyisoprenoid latex while keeping its latex state has superior heat resistance and weather resistance. The present invention has also been accomplished based on these findings.

Specifically, the present invention provides a rubber-like or rubber-like-material-containing article comprising or being made from a hydrogenated natural polyisoprenoid or a modified product thereof.

The rubber-like or rubber-like-material-containing articles according to the present invention include, as a first embodiment, a rubber-like elastic article made from a hydrogenated natural polyisoprenoid or a modified product thereof. The hydrogenated natural polyisoprenoid can be, for example, a polymer as a product of the reaction of a natural polyisoprenoid with hydrogen in the presence of a hydrogenation catalyst in a solvent. The hydrogenated natural polyisoprenoid preferably has a degree of hydrogenation of 50% or more. The hydrogenated natural polyisoprenoid preferably has a weight-average molecular weight of $20 \times 10^4$ or more and a molecular-weight distribution of 2.0 or more. Such hydrogenated natural polyisoprenoids include, for example, a hydrogenated product of a polymer of isoprene unit derived from *Hevea brasiliensis*, *Ficus elastica*, *Eucommia ulmoides*, or a fungus belonging to the genus *Lactarius*.

The present invention further provides a method for producing a rubber-like elastic article, comprising the step of subjecting a rubber composition comprising a hydrogenated natural polyisoprenoid or a modified product thereof to molding/forming.

The rubber-like or rubber-like-material-containing articles according to the present invention include, as a second embodiment, a resin modifier comprising a rubber-like polymer as a hydrogenated natural polyisoprenoid, or a modified product thereof. The rubber-like polymer can be a polymer as a product of the reaction of a natural polyisoprenoid with hydrogen in the presence of a hydrogenation catalyst in a solvent. The natural polyisoprenoid in the rubber-like polymer preferably has a degree of hydrogenation of 50% or more. The rubber-like polymer preferably has a weight-average molecular weight of $20 \times 10^4$ or more and a molecular-weight distribution of 2.0 or more.

The present invention also provides a resin composition comprising a resin and the resin modifier. The resin composition preferably comprises about 0.1 to about 100 parts by weight of the resin modifier per 100 parts by weight of the resin.

The present invention further provides a molded article made from the resin composition.

The rubber-like or rubber-like-material-containing articles according to the present invention also include, as a third embodiment, a modified latex as a hydrogenated natural polyisoprenoid latex. Such modified latices include as a product of the reaction of a natural polyisoprenoid latex with hydrogen in the presence of a hydrogenation catalyst. The hydrogenated natural polyisoprenoid in the modified latex preferably has a degree of hydrogenation of 50% or more. The natural polyisoprenoid latex can be a latex derived from *Hevea brasiliensis*, *Ficus elastica*, *Eucommia ulmoides*, or a fungus belonging to the genus *Lactarius*.

In addition, the present invention provides an article comprising a hydrogenated natural polyisoprenoid or a modified product thereof, prepared by using the modified latex.

The present invention exhibits following advantages.

The rubber-like articles or rubber-like-material-containing articles according to the present invention can be produced using natural polyisoprenoids as raw material and have excellent heat resistance and weather resistance.

The rubber-like elastic articles according to the present invention can be produced from a natural polyisoprenoid and have excellent mechanical properties, superior heat resistance, low-temperature resistance, and weather resistance.

The resin modifiers according to the present invention can use environment-friendly plants as raw material and impart, for example, superior weather resistance, impact resistance, low-temperature impact resistance, and excellent appearance of molded articles to resins.

The resin compositions and molded articles according to the present invention are imparted typically with superior weather resistance, impact resistance, low-temperature impact resistance, and excellent appearance of molded articles without impairing original properties of resins.

In addition, articles containing hydrogenated natural polyisoprenoids obtained from modified latices according to the present invention have superior heat resistance and weather resistance and are excellent typically in chemical resistance, low-temperature resistance, and mechanical properties. They are also preferred from the viewpoints of resources and environment, because they use plant-derived raw materials.

BEST MODE FOR CARRYING OUT THE INVENTION

The rubber-like articles or rubber-like-material-containing articles according to the present invention comprise or are made from hydrogenated natural polyisoprenoids or modified products thereof.

The hydrogenated natural polyisoprenoids can be obtained by hydrogenating natural polyisoprenoids. The natural polyisoprenoids are not specifically limited, as long as they are polymers comprising isoprene unit ($C_5H_8$) as constitutional unit. Representative examples thereof are polyisoprenoids derived from plants such as *Hevea brasiliensis*, *Ficus elastica*, and *Eucommia ulmoides*, and polyisoprenoids derived from fungi such as *Lactarius volemus* and other fungi belonging to the genus *Lactarius*. Natural polyisoprenoids can be used in hydrogenation as intact as extracted or collected from plants and fungi or after purification according to a suitable procedure or device.

The modified latices according to the present invention are obtained by hydrogenating natural polyisoprenoid latices in the state of latex (in the state of aqueous emulsion). The natural polyisoprenoid latices are not specifically limited, as long as they are latices of polymers comprising isoprene unit ($C_5H_8$) as constitutional unit. Representative examples thereof are polyisoprenoid latices derived from the plants such as *Hevea brasiliensis*, and polyisoprenoid latices derived from the fungi such as *Lactarius volemus*. The natural polyisoprenoid latices can be used as intact as collected from plants or fungi, or they can be diluted or concentrated to a suitable concentration or subjected to an appropriate treatment such as deproteination before use.

The hydrogenation reaction of a natural polyisoprenoid is carried out, for example, by reacting the natural polyisoprenoid with hydrogen in the presence of a hydrogenation catalyst in a suitable solvent. It is also acceptable to subject a latex of a natural polyisoprenoid to a hydrogenation reaction, as is described above. The solvent can be any solvent that can dissolve or disperse the natural polyisoprenoid and does not inhibit the reaction. Examples thereof include aromatic hydrocarbons such as benzene, toluene, xylenes, and ethylbenzene; aliphatic hydrocarbons such as pentane, hexane, heptane, octane, and decane; alicyclic hydrocarbons such as cyclopentane, cyclohexane, and methylcyclohexane; ketones such as acetone and methyl ethyl ketone; esters such as ethyl acetate and butyl acetate; alcohols such as methanol, ethanol, isopropyl alcohol, and butanol; ethers such as diethyl ether and tetrahydrofuran; water; and mixtures of these solvents. The amount of the solvent can be such an amount as to carry out, for example, stirring operation smoothly and is generally about 10 to about 200 parts by weight, and preferably about 15 to about 60 parts by weight, per 1 part by weight of the natural polyisoprenoid used as raw material. The natural polyisoprenoid can be fully dissolved in the solvent or dispersed therein.

The hydrogenation catalyst for use in the reaction can be a homogenous or heterogenous catalyst generally used in hydrogenation of carbon-carbon double bond. Examples of the homogenous catalyst include metal complex catalysts including rhodium complex catalysts such as $RhCl(PPh_3)_3$, of which complex catalysts comprising a metal element of the Group 8, 9, or 10 of the Periodic Table of Elements are preferred; and metal salts or ionic compounds containing metals, such as nickel carbonate-trialkylaluminum, palladium chloride, and palladium acetate, of which metal salts comprising a metal element of the Group 8, 9, or 10 of the Periodic Table of Elements are preferred. Examples of the heterogenous catalyst are solid catalysts including palladium catalysts such as $Pd/CaCO_3$ and Pd/C, of which catalysts comprising catalytically active ingredients comprising a metal element of the Group 8, 9, or 10 of the Periodic Table of Elements supported on a carrier are preferred. The amount of the catalyst varies depending typically on the type of the catalyst but is generally about 0.01 to about 30 percent by weight, and preferably about 0.1 to about 20 percent by weight, relative to the natural polyisoprenoid used as raw material. This amount is relative to a natural polyisoprenoid in a natural polyisoprenoid latex if used as raw material.

A salt such as sodium chloride may be added to the system for solubilizing the catalyst, when water is used as the solvent, for example, in hydrogenation of a natural polyisoprenoid latex, and a metal salt such as palladium chloride is used as the catalyst. The metal salt such as palladium chloride, if used as the catalyst, is reduced in the reaction system to thereby form ultrafine metal particles having superior catalytic activities.

While varying depending typically on the type of the catalyst, the reaction temperature can be selected within the range of, for example, about 50° C. to about 80° C., preferably about 60° C. to about 80° C., and more preferably about 65° C. to 75° C. when the metal complex catalyst, for example, is used. If the reaction temperature is excessively high, a lot of side reactions such as gelation of rubber, or molecular cleavage (so as to have a lower molecular weight) occurs, and a polymer having desired mechanical strength and thermal properties and being suitable for a rubber-like elastic article may not be significantly obtained. For example, if the reaction temperature is set at 90° C. or higher, the weight-average molecular weight decreases to $18 \times 10^4$ after reaction for twenty-four hours, which fails to yield a molded article excellent in mechanical strength and creep properties. If the reaction temperature is set at 100° C. or higher, gelation markedly occurs, and the resulting article may not undergo subsequent processing as a rubber. If the reaction temperature is excessively low, the reaction rate may decrease, which is disadvantageous in productivity.

When a natural polyisoprenoid latex is subjected to hydrogenation, the reaction temperature can be selected within the range of, for example, about 0° C. to about 100° C., and preferably about 10° C. to about 70° C., while varying depending typically on the type of the catalyst. The reaction temperature is, for example, about 0° C. to about 100° C., and preferably about 10° C. to about 60° C. when a metal catalyst such as palladium chloride is used. If the reaction temperature is excessively high, the latex may tend to coagulate, and a lot of side reactions such as molecular cleavage (so as to have a lower molecular weight) proceed, to thereby fail to provide desired levels of properties such as mechanical strength and thermal properties. If the reaction temperature is excessively low, the reaction rate may decrease, which is disadvantageous in productivity.

The reaction pressure can be selected as appropriate in consideration typically of reaction efficiency, operability, and cost of apparatus. While varying depending typically on the type of the catalyst and the reaction temperature, the reaction pressure is generally 0.1 to 15 MPa and preferably 2 to 10 MPa when the metal complex catalyst, for example, is used.

It is generally atmospheric pressure to 15 MPa, and preferably atmospheric pressure to 10 MPa when a metal salt such as palladium chloride is used. The reaction time can be selected as appropriate according to the reaction temperature and reaction pressure.

Some catalysts may show decreased catalytic activities when water is present in the reaction system. Consequently, water in the reaction system may be removed using a dehydrating agent such as molecular sieves before the reaction (before the addition of the catalyst).

The reaction is carried out in the presence of or under the circulation of hydrogen. The reaction process can be any process such as batch process, semi-batch process, or continuous process.

After the completion of reaction, a polymer (hydrogenated natural polyisoprenoid; rubber-like polymer) formed as a result of the reaction can be purified and isolated by a purification procedure such as precipitation, reprecipitation, filtration, washing, and/or drying. The modified latex according to the present invention can be obtained by removing the catalyst from the reaction mixture by means typically of filtration. A metal salt such as palladium chloride, if used as the catalyst, can be easily removed typically by filtration, by stirring the reaction mixture after the completion of reaction in the presence of oxygen or air, or by adding a suitable oxidizing agent such as hydrogen peroxide to the reaction mixture. This is because a metal once formed in the system as a result of reduction is oxidized and coagulates so as to have larger particle sizes and are thereby easily removed.

The hydrogenated natural polyisoprenoid (rubber-like polymer) has a degree of hydrogenation of preferably 50% or more, more preferably 70% or more, especially preferably 90% or more, and particularly preferably 95% or more. The higher the degree of hydrogenation is, the more excellent in heat resistance, aging resistance, weather resistance, abrasion resistance, and SET properties is the resulting article such as a rubber-like elastic article. The degree of hydrogenation "r" indicates the degree of hydrogenation of carbon-carbon double bond in the raw material natural polyisoprenoid [r= $(D_0-D)/D_0 \times 100(\%)$, wherein $D_0$ represents the amount of carbon-carbon double bond of the natural polyisoprenoid (mol/g); and D represents the amount of carbon-carbon double bond of the hydrogenated product after reaction (mol/g)]. The amount $D_0$ of carbon-carbon double bond of the natural polyisoprenoid for use in the present description is the value assuming that the natural polyisoprenoid is an isoprene homopolymer. The amount D of carbon-carbon double bond of the hydrogenated product after reaction can be determined by $^1$H-NMR analysis or iodine number measurement. Hydrogenated moieties generally have an ethylene-propylene alternating copolymerization structure. In the hydrogenated natural polyisoprenoid, 50% or more, more preferably 70% or more, especially preferably 90% or more, and further preferably 95% or more of the principal chain preferably has an ethylene-propylene alternating copolymerization structure.

The weight-average molecular weight of the hydrogenated natural polyisoprenoid (rubber-like polymer) is, for example, $20 \times 10^4$ or more, preferably $40 \times 10^4$ or more, and more preferably $60 \times 10^4$ or more. If the weight-average molecular weight is excessively low, the physical strength and creep properties may unpreferably decrease. The upper limit of the weight-average molecular weight may be, but is not specifically limited to, for example, about $300 \times 10^4$. The weight-average molecular weight decreases if the reaction temperature in the hydrogenation reaction is excessively high, as is described above.

The molecular-weight distribution [Mw (weight-average molecular weight)/Mn (number-average molecular weight)] of the hydrogenated natural polyisoprenoid (rubber-like polymer) is, for example, 2.0 or more, preferably 2.3 or more, and more preferably 2.6 or more. An excessively small molecular-weight distribution is undesirable because it induces decreased processability. The upper limit of the molecular-weight distribution may be, but is not limited to, for example, about 7.0. The molecular-weight distribution decreases if the reaction temperature in the hydrogenation reaction is excessively high, because polymer molecules having relatively higher molecular weights become susceptible to cleavage.

The modified products of the hydrogenated natural polyisoprenoid (rubber-like polymer) in the present invention include, for example, graft modified products, epoxidized modified products, carboxylated modified products, and crosslinked products. The graft modified products can be obtained, for example, by subjecting a hydrogenated natural polyisoprenoid (rubber-like polymer) and a graftable monomer capable of undergoing grafting to a conventional polymerization procedure such as emulsion polymerization, solution polymerization, bulk polymerization, or suspension polymerization.

Examples of the graftable monomer include carboxyl group-containing monomers such as (meth)acrylic acid, maleic acid, maleic anhydride, itaconic acid, itaconic anhydride, and fumaric acid; hydroxyl group-containing monomers such as 2-hydroxyethyl(meth)acrylate and 2-hydroxypropyl (meth)acrylate; epoxy group-containing monomers such as glycidyl(meth)acrylate; amide monomers such as (meth)acrylamide, N-methylol(meth)acrylamide, diacetoneacrylamide, and maleic acid monoamide; and amino group-containing monomers such as dimethylaminoethyl (meth) acrylate. The amount of the graftable monomer is, for example, about 0.1 to about 1000 parts by weight, preferably about 1 to about 200 parts by weight, and more preferably about 5 to about 100 parts by weight, per 100 parts by weight of the hydrogenated natural polyisoprenoid (rubber-like polymer).

A polymerization initiator, a chain transfer, and/or an emulsifier, for example, can be used in the polymerization according to the type of the polymerization. The polymerization initiator, chain transfer, and emulsifier can be those conventionally used. The polymerization procedure is not specifically limited, and a conventional procedure such as simultaneous addition or consecutive addition can be employed.

The rubber-like or rubber-like-material-containing articles according to the present invention include rubber-like elastic articles made from hydrogenated natural polyisoprenoids or modified products thereof.

The rubber-like elastic articles can be produced by subjecting a rubber composition comprising the thus-prepared hydrogenated natural polyisoprenoid or a modified product thereof to molding/forming, and preferably to molding/forming accompanied by crosslinking. The rubber composition may further comprise a variety of compounding ingredients. Examples of such compounding ingredients are peptizers, softeners/plasticizers, crosslinking compounding ingredients, antioxidants, foaming agents, coupling agents, processing aids, colorants, fillers, and reinforcing agents.

The peptizers include, for example, aromatic disulfide compounds and aromatic mercaptan metal salt compounds. The softeners/plasticizers include mineral oil softeners, vegetable oil softeners, and synthetic softeners.

The crosslinking compounding ingredients include crosslinking agents, vulcanization accelerators, vulcanization supplement accelerators, and scorch retarders. Examples of the crosslinking agents are sulfur or insoluble sulfur (vulcanizing agents), dicumyl peroxide and other peroxides, and oximes. The amount of such crosslinking agents is, for example, about 0.3 to about 5 parts by weight per 100 parts by weight of the hydrogenated natural polyisoprenoid or a modified product thereof. The vulcanization accelerators include, for example, guanidine compounds, thiuram compounds, dithiocarbamate compounds, thiazole compounds, and sulfenamide compounds. The amount of such vulcanization accelerators is, for example, about 0.2 to about 5 parts by weight per 100 parts by weight of the hydrogenated natural polyisoprenoid or a modified product thereof. The vulcanization supplement accelerators include zinc oxide. The amount of such vulcanization supplement accelerators is, for example, about 1 to about 10 parts by weight per 100 parts by weight of the hydrogenated natural polyisoprenoid or a modified product thereof. The scorch retarders include phthalic anhydride and N-cyclohexylthiophthalimide.

The antioxidants include amine antioxidants, phenolic antioxidants, sulfur-containing secondary (auxiliary) antioxidants, phosphorus-containing secondary antioxidants, tributylthiourea, and wax. The foaming agents include inorganic foaming agents and organic foaming agents. The coupling agents can be coupling agents for white fillers, and coupling agents for carbon black. The processing aids include lubricants such as paraffin, hydrocarbon resins, stearic acid and other higher fatty acids, stearic acid amide and other higher fatty acid amides, butyl stearate and other higher fatty acid esters, stearyl alcohol and other higher aliphatic alcohols, glycerol fatty acid esters and other partial esters of fatty acids and polyhydric alcohols, zinc stearate and other metal salts of higher fatty acids; and tackifiers such as cumarone resins, phenol resins/terpene resins, petroleum hydrocarbon resins, and rosin derivatives. The amount of such processing aids is, for example, about 0.1 to about 10 parts by weight per 100 parts by weight of the hydrogenated natural polyisoprenoid or a modified product thereof.

Inorganic pigments and organic pigments are used as the colorants. The fillers include reinforcing fillers such as carbon black and silica; reinforcing short fibers; non-reinforcing fillers such as clay/talc, carbonates, alumina hydrates, and barium sulfates; and functional fillers such as conductive substances. The amount of such fillers is, for example, about 1 to about 200 parts by weight, and preferably about 5 to about 100 parts by weight per 100 parts by weight of the hydrogenated natural polyisoprenoid or a modified product thereof.

The molding/forming of the rubber composition is carried out by a kneading step of kneading the rubber composition and a molding step of molding the kneaded product (compounded rubber) obtained in the kneading step. The molding/forming process may further comprise a masticating step of masticating the hydrogenated natural polyisoprenoid or a modified product thereof before the kneading step. The kneading can be carried out typically with a two-roll mill or a closed twin-screw kneader. The molding is conducted according to a (mold cure) process of molding, and simultaneously heating and crosslinking a kneaded uncrosslinked compounded rubber having flowability, or a process of molding a kneaded uncrosslinked compounded rubber having flowability with an extruder or a calendar and then heating and crosslinking the molded article by means typically of steam pan vulcanization or continuous vulcanization. The molding procedure in mold vulcanization can be any one such as compression molding, transfer molding, injection molding, injection-compression molding, or liquid injection. After the molding/forming, finishing and surface treatment are generally carried out.

The thus-prepared rubber-like elastic articles (molded articles) have excellent mechanical properties and are remarkably superior in heat resistance to natural rubber. They are also excellent in compression set (SET) properties and weather resistance. Among them, those crosslinked with peroxide are further excellent in abrasion resistance. In addition, the molded articles show lower glass transition temperatures and have more excellent low-temperature resistance than molded articles using, for example, EPDM (ethylene-propylene-diene rubber), a representative synthetic rubber, since the hydrogenated natural polyisoprenoids are linear pseudo perfectly alternating ethylene-propylene copolymers. The molded articles are also excellent in processability and fatigue durability (fatigue resistance).

The rubber-like elastic articles can be used as tires, tubes, medical-use rubber articles, latex dipped articles, rubber threads, belts, and rubber articles for industrial uses such as seismic base isolation, vibration isolation, and packing.

The rubber-like or rubber-like-material-containing articles according to the present invention further include resin modifiers each comprising a rubber-like polymer as a hydrogenated natural polyisoprenoid, or a modified product thereof.

The shapes and configurations of the resin modifiers comprising a rubber-like polymer or a modified product thereof are not specifically limited and can be any of, for example, powders, granules, bulks, and pellets. These shapes and configurations can be realized according to a conventional procedure. These resin modifiers may further comprise appropriate additives.

The resin compositions according to the present invention each comprise a resin and the resin modifier. The resin includes naturally occurring polymer resins, polymer resins synthesized by microorganisms, and chemically synthesized polymer resins. The naturally occurring polymer resins are not specifically limited, as long as they are polymers contained typically in plants and animals, or derivatives thereof, and include chitosan, lignin, starch, nitrocellulose, acetyl cellulose, and grafted cellulose. The polymer resins synthesized by microorganisms are not specifically limited, as long as they are polymers synthesized by microorganisms, or derivatives thereof, and include polyhydroxybutylates and derivatives thereof. The chemically synthesized polymer resins are not specifically limited, as long as they are chemically synthesized polymers, and include thermoplastic resins (general-purpose plastics or engineering plastics) including olefinic resins such as polypropylenes and polyethylenes, styrenic resins such as polystyrenes, methacrylic resins, polyester resins such as poly(ethylene terephthalate)s and poly(butylene terephthalate)s, polyamide resins, polycarbonate resins, polyacetal resins, poly(phenylene ether)s, poly(phenylene sulfide)s, and polysulfones; thermosetting resins such as epoxy resins, phenol resins, urea resins, and melamine resins; and biodegradable polymer resins such as poly(lactic acid)s, polycaprolactones, aliphatic polyesters, aliphatic polyester amides, and poly(vinyl alcohol)s. Each of these resins can be used alone or in combination.

The proportions of the resin and the resin modifier can be selected as appropriate according to the use and desired properties. In general, the amount of the resin modifier is about 0.1 to about 100 parts by weight, preferably about 1 to about 80 parts by weight, and more preferably about 2 to about 50 parts by weight, per 100 parts by weight of the resin. The resin modifier in an excessively small amount may not sufficiently modify the resin. In contrast, the resin modifier in an excessively large amount may reduce the properties of the resin.

The resin compositions according to the present invention can further comprise a variety of additives. The additives include fillers such as talc, wollastonite, silica, kaolin, clay, and carbon black; ultraviolet absorbers; antioxidants; lubricants such as fatty acid esters, aliphatic higher alcohols, and metal soaps; dyes and pigments; stabilizers; plasticizers; and flame-retarders.

The resin compositions according to the present invention can be produced, for example, by homogenously admixing or kneading the resin, the resin modifier, and additives according to necessity using a device that can admix materials by the action of shearing force. Examples of the device are closed kneaders such as Banbury mixer and Intermix mixer; single-screw extruders; and twin-screw extruders. The mixing or kneading temperature and time can be appropriately selected so as to carry out homogenous admixing in consideration of, for example, the melting point of used resin. For example, the mixing or kneading can be carried out while selecting conditions as appropriate do as to admix the resin and the resin modifier homogeneously, for example, by initially kneading the resin modifier typically in a kneader so as to plasticize the resin modifier, adding the resin to the plasticized resin modifier, and carrying out further kneading, or by placing the resin and the resin modifier simultaneously in a kneader and carrying out kneading.

The resin compositions according to the present invention can be molded by a molding process such as injection molding, extrusion molding, blow molding, mold forming, calendering molding, compression molding, or transfer molding. The resulting molded articles have more excellent properties than the material resin before modification, while maintaining original properties of the material resin. Examples of the former properties are impact resistance and other mechanical properties, low-temperature impact resistance, weather resistance, appearance of molded articles, and heat resistance. Consequently, molded articles made from the resin compositions according to the present invention can be used according to the properties of the resin as, for example, molded resin articles requiring heat resistance, weather resistance, and impact resistance, including interior and exterior parts of automobiles, such as bumpers, dashboards or instrument panels, radiator grilles, and side mouldings; interior and exterior parts of household electrical appliances such as air conditioners and television sets; and interior and exterior parts of electronic equipment such as personal computers, digital cameras, and cellular mobile phones.

The rubber-like or rubber-like-material-containing articles according to the present invention further include modified latices as hydrogenated products of natural polyisoprenoid latices.

The modified latices can be obtained by hydrogenating natural polyisoprenoid latices as intact as latex.

The articles according to the present invention containing a hydrogenated natural polyisoprenoid or a modified product thereof are prepared or formed using the thus-prepared modified latices. For example, latex-form paints (water-based paints), primers, coating agents, sealing agents, and adhesives can be prepared by adding additives to the modified latex or a modified product thereof (graft modified product, epoxidized modified product, carboxylated modified product, or crosslinked product). Examples of the additives herein are colorants including pigments and dyes, plasticizers, dispersing agents, tackifiers, fungicides, ultraviolet absorbers, antioxidants, fillers, and tackifying resins. Various articles can be produced by admixing the modified latex with compounding ingredients according to necessity and subjecting the mixture to molding/forming, especially to molding/forming accompanied by crosslinking. Examples of the compounding ingredients are peptizers, softeners/plasticizers, crosslinking compounding ingredients, antioxidants, foaming agents, coupling agents, processing aids, colorants, fillers, and reinforcing agents.

The peptizers and softeners/plasticizers can be those mentioned above.

The crosslinking compounding ingredients include crosslinking agents, vulcanization accelerators, vulcanization supplement accelerators, and scorch retarders. The crosslinking agents, vulcanization accelerators, vulcanization supplement accelerators, and scorch retarders can be those mentioned above. The amount of the crosslinking agent is, for example, about 0.3 to about 5 parts by weight per 100 parts by weight of the hydrogenated natural polyisoprenoid. The amount of vulcanization accelerator is, for example, about 0.2 to about 5 parts by weight per 100 parts by weight of the hydrogenated natural polyisoprenoid. The amount of the vulcanization supplement accelerator is, for example, about 1 to about 10 parts by weight per 100 parts by weight of the hydrogenated natural polyisoprenoid.

The antioxidants, foaming agents, coupling agents, and processing aids can be those mentioned above. The amount of processing aid is, for example, about 0.1 to 10 parts by weight per 100 parts by weight of the hydrogenated natural polyisoprenoid.

The colorants and fillers can be those mentioned above. The amount of the filler is, for example, about 1 to about 200 parts by weight, and preferably about 5 to about 100 parts by weight per 100 parts by weight of the hydrogenated natural polyisoprenoid.

The molding/forming procedure is not specifically limited and can be a procedure generally used for preparing molded articles using latices as raw material. Representative molding/forming procedures using latices include film forming by dipping. The film forming by dipping is carried out, for example, by incorporating ingredients such as crosslinking agents, vulcanization accelerators, and vulcanization supplement accelerators to the modified latex to yield a modified latex composition, dipping a mold having an inner wall homogenously coated with a congealing liquid in the modified latex composition according to anode dipping to form a film, and carrying out heating and vulcanization at suitable temperatures. The resulting articles obtained by film forming (dipped articles) include rubber gloves, catheters, condoms, and finger cots.

The resulting articles according to the present invention containing a hydrogenated natural polyisoprenoid or a modified product thereof are typically excellent in heat resistance and weather resistance as compared with natural rubber articles. They are also excellent in mechanical properties, low-temperature resistance, processability, fatigue durability, and chemical resistance.

The present invention will be illustrated in further detail with reference to several examples below which by no means limit the scope of the present invention. The average molecular weights and molecular-weight distributions of polymers (hydrogenated natural rubbers) were determined using a gel permeation chromatographic instrumentation (GPC) under the following conditions.

Detector: differential refractometer (RI)
Injected liquid: 0.1 percent by weight tetrahydrofuran solution of a sample
Eluent: tetrahydrofuran
Determination: in terms of standard polystyrene

Example 1

In 6.86 kg of toluene was dissolved 140 g of a solid natural rubber [trade name of "SMR-CV60", a natural rubber of Malaysia origin, a weight-average molecular weight (Mw) of $130\times10^4$, and a molecular-weight distribution (Mw/Mn) of 5.7]. Molecular sieves were placed into the solution, the mixture was left stand for one day so as to remove water, from which the molecular sieves were then removed by filtration. The filtrate and 8 g of a catalyst [$RhCl(PPh_3)_3$] were placed in an autoclave. After the inside atmosphere of the autoclave was replaced with hydrogen gas, hydrogen gas was injected into the autoclave (8 MPa), the temperature was elevated to 70° C. to 75° C., and a hydrogenation reaction was conducted with stirring for ninety-six hours. Methanol was added in small portions to the solution after reaction until a solid rubber completely precipitated. The solid was filtrated and was washed with methanol. After repeating the filtration and washing procedure three times, the solid was dried at 60° C. in a vacuum for twenty-four hours. The resulting solid (hydrogenated product) has a degree of hydrogenation of 70%, a weight-average molecular weight (Mw) of $100\times10^4$, and a molecular-weight distribution (Mw/Mn) of 3.2.

In a closed kneader were placed 100 parts by weight of the above-prepared hydrogenated product, 1 part by weight of stearic acid, 5 parts by weight of zinc oxide, and 20 parts by weight of carbon black [a product of Toyo Carbon Co., Ltd. under the trade name of "N220"], and the mixture was kneaded at 40 rpm, at 50° C. for three minutes. The kneaded product was further kneaded with 2.5 parts by weight of a vulcanization accelerator [N-cyclohexylbenzothiazylsulfonamide (CBS), a product of Ouchi Shinko Chemical Industrial Co., Ltd. under the trade name of "Nocceler CZ"] and 1 part by weight of sulfur in an open roll at 50° C., the resulting kneaded product was preformed in accordance with the shape of a die, was subjected to press vulcanization at 160° C. for about sixty minutes, and thereby yielded a sheet 2 mm thick.

Example 2

A hydrogenated product was obtained by the procedure of Example 1, except for using the catalyst in an amount of 9 g. The resulting hydrogenated product has a degree of hydrogenation of 90%, a weight-average molecular weight (Mw) of $114\times10^4$, and a molecular-weight distribution (Mw/Mn) of 3.2.

In a closed kneader were placed 100 parts by weight of the above-prepared hydrogenated product, 1 part by weight of stearic acid, 5 parts by weight of zinc oxide, and 20 parts by weight of carbon black [a product of Toyo Carbon Co., Ltd. under the trade name of "N220"], and the mixture was kneaded at 40 rpm, at 50° C. for three minutes. The kneaded product was further kneaded with 2.5 parts by weight of a vulcanization accelerator [N-cyclohexylbenzothiazylsulfonamide (CBS), a product of Ouchi Shinko Chemical Industrial Co., Ltd. under the trade name of "Nocceler CZ"] and 1 part by weight of sulfur in an open roll at 50° C., the resulting kneaded product was preformed in accordance with the shape of a die, was subjected to press vulcanization at 160° C. for about sixty minutes, and thereby yielded a sheet 2 mm thick.

Example 3

A hydrogenated product was obtained by the procedure of Example 1, except for using the catalyst in an amount of 18 g. The resulting hydrogenated product has a degree of hydrogenation of 100%, a weight-average molecular weight (Mw) of $83\times10^4$, and a molecular-weight distribution (Mw/Mn) of 2.7.

In a closed kneader were placed 100 parts by weight of the above-prepared hydrogenated product, 1 part by weight of stearic acid, 5 parts by weight of zinc oxide, and 20 parts by weight of carbon black, and the mixture was kneaded at 40 rpm, at 150° C. for three minutes. The kneaded product was further kneaded with 3 parts by weight of a peroxide [a product of NOF CORPORATION under the trade name of "PEROXYMON F40"] in an open roll at 50° C., the resulting kneaded product was preformed in accordance with the shape of a die, was subjected to press vulcanization (crosslinking) at 160° C. for about sixty minutes, and thereby yielded a sheet 2 mm thick.

Comparative Example 1

In a closed kneader were placed 100 parts by weight of a solid natural rubber [trade name of "SMR-CV60", a natural rubber of Malaysia origin, a weight-average molecular weight (Mw) of $130\times10^4$, and a molecular-weight distribution (Mw/Mn) of 5.7], 1 part by weight of stearic acid, 5 parts by weight of zinc oxide, and 20 parts by weight of carbon black [a product of Toyo Carbon Co., Ltd. under the trade name of "N220"], and the mixture was kneaded at 40 rpm, at 50° C. for three minutes. The kneaded product was further kneaded with 2.5 parts by weight of a vulcanization accelerator [N-cyclohexylbenzothiazylsulfonamide (CBS), a product of Ouchi Shinko Chemical Industrial Co., Ltd. under the trade name of "Nocceler CZ"] and 1 part by weight of sulfur were kneaded in an open roll at 50° C., the resulting kneaded product was preformed in accordance with the shape of a die, was subjected to press vulcanization at 160° C. for about sixty minutes, and thereby yielded a sheet 2 mm thick.

Comparative Example 2

In a closed kneader were placed 100 parts by weight of a solid natural rubber [trade name of "SMR-CV60", a natural rubber of Malaysia origin, a weight-average molecular weight (Mw) of $130\times10^4$, and a molecular-weight distribution (Mw/Mn) of 5.7], 1 part by weight of stearic acid, 5 parts by weight of zinc oxide, and 20 parts by weight of carbon black [a product of Toyo Carbon Co., Ltd. under the trade name of "N220"], and the mixture was kneaded at 40 rpm, at 50° C. for three minutes. The kneaded product was further kneaded with 3 parts by weight of a peroxide [a product of NOF CORPORATION under the trade name of "PEROXYMON F40"] in an open roll at 50° C., the resulting kneaded product was preformed in accordance with the shape of a die, was subjected to press vulcanization (crosslinking) at 160° C. for about sixty minutes, and thereby yielded a sheet 2 mm thick.

Comparative Example 3

In a closed kneader were placed 100 parts by weight of EPDM (ethylene-propylene-diene rubber) (a product of DSM Copolymer Inc. under the trade name of "8340A", a weight-average molecular weight (Mw) of $28\times10^4$, and a molecular-weight distribution (Mw/Mn) of 2.5), 1 part by weight of stearic acid, 5 parts by weight of zinc oxide, and 20 parts by weight of carbon black [a product of Toyo Carbon Co., Ltd. under the trade name of "N220"], and the mixture was kneaded at 40 rpm, at 150° C. for three minutes. The kneaded product was further kneaded with a vulcanization accelerator

[N-cyclohexylbenzothiazylsulfonamide (CBS), a product of Ouchi Shinko Chemical Industrial Co., Ltd. under the trade name of "Nocceler CZ"] and 1 part by weight of sulfur in an open roll at 50° C., the resulting kneaded product was preformed in accordance with the shape of a die, was subjected to press vulcanization at 160° C. for about sixty minutes, and thereby yielded a sheet 2 mm thick.

Comparative Example 4

In a closed kneader were placed 100 parts by weight of EPDM (ethylene-propylene-diene rubber) [a product of DSM Copolymer Inc. under the trade name of "8340A", a weight-average molecular weight (Mw) of $28 \times 10^4$, and a molecular-weight distribution (Mw/Mn) of 2.5], 1 part by weight of stearic acid, 5 parts by weight of zinc oxide, and 20 parts by weight of carbon black, and the mixture was kneaded at 40 rpm, at 150° C. for three minutes. The kneaded product was further kneaded with 3 parts by weight of a peroxide [a product of NOF CORPORATION under the trade name of "PEROXYMON F40"] in an open roll at 50° C., the resulting kneaded product was preformed in accordance with the shape of a die, was subjected to press vulcanization (crosslinking) at 160° C. for about sixty minutes, and thereby yielded a sheet 2 mm thick.

Physical Properties Evaluation Test 1

The sheets obtained according to Examples 1 to 3 and Comparative Examples 1 to 4 were subjected to tensile tests (tensile break strength and elongation at break), hardness tests (hardness), heat aging tests, abrasion tests, compression set (SET) tests, determination of glass transition temperature (Tg), and ozone cracking tests (determination of ozone resistance). The results are shown in Table 1.

Tensile Test

In accordance with Japanese Industrial Standards (JIS) K 6251, a sample sheet 2 mm thick was punched to form a JIS No. 3 dumbbell test piece which was subjected to a tensile test under the conditions of a reference line interval of 20 mm and a stretching rate of 500 mm/min, and the tensile break strength [TB (MPa)] and the elongation at break [EB (%)] were measured.

Hardness Test

A hardness test in accordance with JIS K 6253 was conducted using a Durometer type A to thereby determine the hardness.

Heat Aging Test

In accordance with JIS K 6257, a sample sheet 2 mm thick was punched to form a JIS No. 3 dumbbell test piece which was subjected to heat aging in a gear oven at 100° C. for ninety-six hours, and a tensile test and a hardness test were conducted by the above procedures, and the degrees of aging in tensile break strength TB, elongation at break EB and hardness [ΔTB (%), ΔEB (%), and Δhardness (%)] were determined.

Abrasion Test

An abrasion test was conducted in accordance with JIS K 6264 using a picoabrasion tester under a load of 44 N, at 60 rpm, and repeating a cycle of each twenty times of forward and reversal directions two times, a total of eighty times, and the abrasion loss (g) was determined.

Compression Set Test

A compression set (SET) test was conducted in accordance with JIS K 6262 using a large-sized test piece at 70° C. for twenty-four hours, and the compression set (SET) (%) was determined.

Determination of Glass Transition Temperature

Using a dynamic viscoelasticity measuring instrument (DMS), the tan δ peak temperature was determined during temperature elevation at 20 Hz, from −100° C. to 100° C. at a rate of 5° C./min, and the glass transition temperature [Tg (° C.)] was determined.

Ozone Cracking Test (Determination of Ozone Resistance)

In accordance with JIS K 6259, a sample sheet 2 mm thick was punched to yield a JIS No. 1 dumbbell test piece (strip 10 mm wide) which was stretched 50%, was fixed in a dedicate holder, was placed in an atmosphere of 40° C. and an ozone concentration of 50 pphm for ninety-six hours, and whether or not cracking caused by ozone occurred was determined.

TABLE 1

| | | Examples | | | Comparative Examples | | | |
|---|---|---|---|---|---|---|---|---|
| | | 1 | 2 | 3 | 1 | 2 | 3 | 4 |
| Physical | TB (MPa) | 7.4 | 11 | 12 | 32.6 | 18.6 | 11 | 11 |
| properties | EB (%) | 280 | 420 | 460 | 570 | 380 | 360 | 330 |
| | hardness | 65 | 63 | 64 | 56 | 54 | 63 | 60 |
| Aging | ΔTB (%) | −7 | −7 | −1 | −57 | −93 | 11 | −54 |
| properties | ΔEB (%) | −10 | −26 | 2 | −19 | −42 | −6 | −52 |
| | Δhardness (%) | 1 | 4 | 1 | −9 | −29 | −1 | 5 |
| Abrasion loss (g) | | 0.035 | 0.028 | 0.004 | 0.03 | 0.1 | 0.04 | 0.017 |
| SET (%) | | 12.9 | 16.4 | 8 | 30.3 | 12 | 22.6 | 10 |
| Tg (° C.) | | −43 | −43 | −43 | −43 | −43 | −34 | −34 |
| Ozone cracking | | C-3 | C-2 | None | C-3 | C-3 | None | None |

A comparison of Examples 1 and 2 with Comparative Example 1 shows that the rubber-like elastic articles according to the present invention are significantly superior in heat resistance (heat aging resistance) to the elastomer produced from a natural rubber. A comparison of Examples 1 and 2 with Comparative Example 3, and a comparison of Example 3 with Comparative Example 4 show that the rubber-like elastic articles according to the present invention are superior in abrasion resistance to EPDM, a representative synthetic rubber. Among them, the rubber-like elastic article produced as a result of crosslinking with peroxide (Example 3) has markedly improved abrasion resistance even if compared with the elastomer produced from natural rubber (Comparative Example 2). Of the rubber-like elastic articles according to the present invention, those having degrees of hydrogenation of 90% or more (Examples 2 and 3) are superior in weather resistance to the elastomers produced from natural rubber (Comparative Examples 1 and 2), and one having a degree of hydrogenation of 100% (Example 3) is significantly superior in weather resistance to the elastomers produced from natural rubber (Comparative Examples 1 and 2). A comparison of Examples 1 and 2 with Comparative Example 3 shows that the present invention also improves SET properties. The rubber-like elastic articles according to the present invention are comparable in glass transition temperature with the elastomers produced from natural rubber and are superior in low-temperature resistance to EPDM. As is described above, the rubber-like elastic articles according to the present invention can improve defects of natural rubber such as heat resistance and weather resistance while keeping excellent properties of the natural rubber, and they can therefore be used in wide applications. Additionally, they are also preferable from the viewpoints of resources and environment, because they use plant-derived raw materials.

Production Example 1

In 6.86 kg of toluene was dissolved 140 g of a solid natural rubber [trade name of "SMR-CV60", a natural rubber of Malaysia origin, a weight-average molecular weight (Mw) of $130 \times 10^4$, a molecular-weight distribution (Mw/Mn) of 5.7]. Molecular sieves were placed in the solution, the mixture was left stand for one day so as to remove water, from which the molecular sieves were then removed by filtration. The filtrate and 18 g of a catalyst [$RhCl(PPh_3)_3$] were placed in an autoclave. After the inside atmosphere of the autoclave was replaced with hydrogen gas, hydrogen gas was injected into the autoclave (8 MPa), the temperature was elevated to 70° C. to 75° C., and a hydrogenation reaction was conducted with stirring for ninety-six hours. Methanol was added in small portions to the solution after reaction until a solid rubber completely precipitated. The solid was filtrated and was washed with methanol. After repeating the filtration and washing procedure three times, the solid was dried at 60° C. in a vacuum for twenty-four hours. The resulting rubber-like polymer (hydrogenated natural rubber; powdery) has a degree of hydrogenation of 100%, a weight-average molecular weight (Mw) of $83 \times 10^4$, a molecular-weight distribution (Mw/Mn) of 2.7, and a yield of 130 g. The rubber-like polymer was analyzed by $^{13}$C-NMR to find to have a pseudo completely alternating ethylene-propylene copolymerization structure.

Example 4

In a kneader (Labo Plastomill) controlled at temperatures of 150±10° C. was placed 3 g of the hydrogenated natural rubber obtained according to Production Example 1, and it was plasticized by kneading for three minutes. After the hydrogenated natural rubber was plasticized, the kneader was adjusted to temperatures of 200±10° C., to which 30 g of a polypropylene (PP) [a product of Sumitomo Chemical Co., Ltd. under the trade name of "AZ 564"] was fed, followed by kneading for three minutes. Next, 6 g of talc [a product of Kishida Chemical Co., Ltd. under the trade name of "Talc 020-76005"] was fed to the kneader, followed by kneading for two minutes. The kneaded product was once taken out, was cooled to room temperature, and was pulverized to a diameter of 3 mm. The pulverized kneaded product (resin) was fed to an injection molding machine controlled at temperatures of 200±10° C., was subjected to injection molding, and thereby yielded a test piece.

Example 5

A test piece was prepared by the procedure of Example 4, except for using the hydrogenated natural rubber in an amount of 6 g.

Example 6

In a kneader (Labo Plastomill) controlled at temperatures of 150±10° C. was placed 6 g of the hydrogenated natural rubber obtained according to Production Example 1, and it was plasticized by kneading for three minutes. After the hydrogenated natural rubber was plasticized, 30 g of poly (lactic acid) [a product of Shimadzu Corporation under the trade name of "Lacty 9030"] was added thereto, followed by kneading for three minutes. Next, 6 g of talc [a product of Kishida Chemical Co., Ltd. under the trade name of "Talc 020-76005"] was fed to the kneader, followed by kneading for two minutes. The kneaded product was once taken out, was cooled to room temperature, and was pulverized to a diameter of 3 mm. The pulverized kneaded product (resin) was fed to an injection molding machine controlled at temperatures of 150±10° C., was subjected to injection molding, and thereby yielded a test piece.

Comparative Example 5

To an injection molding machine controlled at temperatures of 200±10° C. were fed 30 g of a polypropylene (PP) [a product of Sumitomo Chemical Co., Ltd. under the trade name of "AZ 564"] and 6 g of talc [a product of Kishida Chemical Co., Ltd. under the trade name of "Talc 020-76005"], and injection molding was conducted to yield a test piece.

Comparative Example 6

In a kneader (Labo Plastomill) controlled at temperatures of 150±10° C. was placed 6 g of natural rubber (NR) [trade name of "SMR-CV60", a natural rubber of Malaysia origin, weight-average molecular weight (Mw) of $130 \times 10^4$, and a molecular-weight distribution (Mw/Mn) of 5.7], and it was plasticized by kneading for three minutes. After the natural rubber was plasticized, the kneader was adjusted to temperatures of 200±10° C., to which 30 g of a polypropylene (PP) [a product of Sumitomo Chemical Co., Ltd. under the trade name of "AZ 564"] was fed, followed by kneading for three minutes. Next, 6 g of talc [a product of Kishida Chemical Co., Ltd. under the trade name of "Talc 020-76005"] was fed to the kneader, followed by kneading for two minutes. The kneaded product was once taken out, was cooled to room temperature, and was pulverized to a diameter of 3 mm. The pulverized kneaded product (resin) was fed to an injection molding machine controlled at temperatures of 200±10° C., was subjected to injection molding, and thereby yielded a test piece.

Comparative Example 7

In a kneader (Labo Plastomill) controlled at temperatures of 150±10° C. was placed 6 g of an ethylene-propylene rubber (EPM) [a product of Sumitomo Chemical Co., Ltd. under the trade name of "Espren V0115"], and it was plasticized by kneading for three minutes. After EPM was plasticized, the kneader was adjusted to temperatures of 200±10° C., to which 30 g of a polypropylene (PP) [a product of Sumitomo Chemical Co., Ltd. under the trade name of "AZ 564"] was fed, followed by kneading for three minutes. Next, 6 g of talc [a product of Kishida Chemical Co., Ltd. under the trade name of "Talc 020-76005"] was fed to the kneader, followed by kneading for two minutes. The kneaded product was once taken out, was cooled to room temperature, and was pulverized to a diameter of 3 mm. The pulverized kneaded product (resin) was fed to an injection molding machine controlled at temperatures of 200±10° C., was subjected to injection molding, and thereby yielded a test piece.

Comparative Example 8

In a kneader (Labo Plastomill) controlled at temperatures of 150±10° C. was placed 6 g of a hydrogenated product of styrene-butadiene-styrene block copolymer (SEBS) [a product of Asahi Chemical Industry Co., Ltd. under the trade name of "Tuftec H1042"], and it was plasticized by kneading for three minutes. After SEBS was plasticized, the kneader was adjusted to temperatures of 200±10° C., to which 30 g of a polypropylene (PP) [a product of Sumitomo Chemical Co., Ltd. under the trade name of "AZ 564"] was fed, followed by kneading for three minutes. Next, 6 g of talc [a product of Kishida Chemical Co., Ltd. under the trade name of "Talc 020-76005"] was fed to the kneader, followed by kneading for two minutes. The kneaded product was once taken out, was cooled to room temperature, and was pulverized to a diameter of 3 mm. The pulverized kneaded product (resin) was fed to an injection molding machine controlled at temperatures of 200±10° C., was subjected to injection molding, and thereby yielded a test piece Comparative Example 9

In a kneader (Labo Plastomill) controlled at temperatures of 150±10° C. was placed 30 g of a poly(lactic acid) [a product of Shimadzu Corporation under the trade name of "Lacty 9030"], and it was kneaded for three minutes. Next, 6 g of talc [a product of Kishida Chemical Co., Ltd. under the trade name of "Talc 020-76005"] was fed to the kneader, followed by kneading for two minutes. The kneaded product was once taken out, was cooled to room temperature, and was pulverized to a diameter of 3 mm. The pulverized kneaded product (resin) was fed to an injection molding machine controlled at temperatures of 150±10° C., was subjected to injection molding, and thereby yielded a test piece.

Comparative Example 10

In a kneader (Labo Plastomill) controlled at temperatures of 150±10° C. was placed 6 g of natural rubber (NR) [trade name of "SMR-CV60", a natural rubber of Malaysia origin, a weight-average molecular weight (Mw) of 130×10$^4$, and a molecular-weight distribution (Mw/Mn) of 5.7], and it was plasticized by kneading for three minutes. After NR was plasticized, 30 g of a poly(lactic acid) [a product of Shimadzu Corporation under the trade name of "Lacty 9030"] was added thereto, followed by kneading for three minutes. Next, 6 g of talc [a product of Kishida Chemical Co., Ltd. under the trade name of "Talc 020-76005"] was fed to the kneader, followed by kneading for two minutes. The kneaded product was once taken out, was cooled to room temperature, and was pulverized to a diameter of 3 mm. The pulverized kneaded product (resin) was fed to an injection molding machine controlled at temperatures of 150±10° C., was subjected to injection molding, and thereby yielded a test piece.

Physical Properties Evaluation Test 2

The molded articles (test pieces) obtained according to Examples 4 to 6 and Comparative Examples 5 to 10 were subjected to determination and evaluation of impact strength at ordinary temperature, impact strength at low temperatures, weather resistance, and appearance of molded articles. The results are shown in Table 2.

Impact Strength at Ordinary Temperature

An Izod impact strength (with notches) was measured in accordance with American Society for Testing Materials (ASTM) standard D-256.

Impact Strength at Low Temperatures

An Izod impact strength (with notches) at −30° C. was measured in accordance with ASTM D-256.

Weather Resistance

Outdoor exposure of the test pieces was conducted for three months in accordance with JIS K 7219. After the exposure, the surfaces of the test pieces were visually observed. A test piece showing no change as compared with that before exposure was evaluated as "Good", and one showing slight cracking and crazing was evaluated as "Failure".

Appearance of Molded Article

The surfaces of the molded articles (test pieces) were visually observed. A test piece showing a smooth surface without crater and interlayer delamination was evaluated as "Good", and one having a rough surface and showing crater and/or interlayer delamination was evaluated as "Failure".

TABLE 2

|  | Examples ||| Comparative Examples ||||||
| --- | --- | --- | --- | --- | --- | --- | --- | --- | --- |
|  | 4 | 5 | 6 | 5 | 6 | 7 | 8 | 9 | 10 |
| PP | 100 | 100 | 0 | 100 | 100 | 100 | 100 | 0 | 0 |
| Poly(lactic acid) | 0 | 0 | 100 | 0 | 0 | 0 | 0 | 100 | 100 |
| Hydrogenated natural rubber | 10 | 20 | 20 | 0 | 0 | 0 | 0 | 0 | 0 |
| NR | 0 | 0 | 0 | 0 | 20 | 0 | 0 | 0 | 20 |
| EPM | 0 | 0 | 0 | 0 | 0 | 20 | 0 | 0 | 0 |
| SEBS | 0 | 0 | 0 | 0 | 0 | 0 | 20 | 0 | 0 |
| Talc | 20 | 20 | 20 | 20 | 20 | 20 | 20 | 20 | 20 |
| Impact strength (J/m) at ordinary temperature | 76 | 112 | 58 | 65 | 71 | 83 | 92 | 33 | 52 |
| Impact strength (J/m) at −30° C. | 14 | 21 | 15 | 10 | 11 | 15 | 16 | 5 | 11 |
| Weather resistance | Good | Good | Good | Good | Failure | Good | Failure | Good | Failure |
| Appearance of molded article | Good | Good | Good | Good | Failure | Good | Good | Good | Failure |

A comparison of Examples 4 and 5 with Comparative Example 5 shows that the impact resistance at ordinary temperature and the impact resistance at low temperatures are significantly improved by adding the resin modifiers according to the present invention to resins. A comparison of Example 5 with Comparative Examples 6 to 8, and a comparison of Example 6 with Comparative Examples 9 and 10 show that the molded articles comprising the resin compositions according to the present invention are superior in impact resistance at ordinary temperature, impact resistance at low temperatures, weather resistance, and appearance of molded articles to the molded articles comprising the resin compositions containing resins and natural rubber, EPM, or SEBS. As is described above, the present invention can improve, for example, impact resistance and impact resistance at low temperatures while maintaining the original properties of resins, and can therefore be applied to a wide variety of applications. In addition, the present invention uses plant-derived raw materials and is preferable from the viewpoints of resources and environment.

Example 7

In a beaker were placed 0.3 g of palladium chloride, 0.5 g of sodium chloride, and 10 g of water, and they were admixed with stirring until they were fully dissolved, to thereby yield an aqueous catalyst solution. In an autoclave having an inner capacity of 200 ml were placed 50 g of a deproteinized natural rubber latex (a solid rubber content of 60 percent by weight) and the aqueous catalyst solution. After replacing the inner atmosphere of the autoclave with hydrogen, the autoclave was pressurized with hydrogen (10 atm=1.01 MPa), and a reaction was conducted with stirring at 30° C. for twenty-four hours. The autoclave was depressurized, and stirring was continued for further twelve hours in an atmosphere of the air while the autoclave was opened. The catalyst was removed from the reaction mixture by filtrating.

To 166.7 parts by weight of the resulting hydrogenated natural rubber latex (modified latex) were added 1 part by weight of sulfur pulverized in a ballmill, 0.5 part by weight of zinc oxide, and 1 part by weight of a vulcanization accelerator [a product of Ouchi Shinko Chemical Industrial Co., Ltd. under the trade name of "Nocceler BZ"] to yield a rubber latex composition. An earthenware sheet uniformly coated with a congealing liquid (30 percent by weight aqueous calcium nitrate solution) and heated at 50° C. was dipped in the rubber latex composition by anodic dipping, was immediately pulled out, was heated and vulcanized in an oven at 100° C. for thirty minutes, and thereby yielded a vulcanized sheet 100 μm thick.

The polymer (hydrogenated natural rubber) in the hydrogenated natural rubber latex has a degree of hydrogenation of 95%, a weight-average molecular weight (Mw) of $100 \times 10^4$, and a molecular-weight distribution (Mw/Mn) of 3.2.

Example 8

A hydrogenated natural rubber latex (modified latex) was prepared by the procedure of Example 7, except for carrying out the reaction for forty-eight hours. To 166.7 parts by weight of the resulting hydrogenated natural rubber latex (modified latex) were added 1 part by weight of sulfur pulverized in a ballmill, 0.5 part by weight of zinc oxide, and 1 part by weight of a vulcanization accelerator [a product of Ouchi Shinko Chemical Industrial Co., Ltd. under the trade name of "Nocceler BZ"] to yield a rubber latex composition. An earthenware sheet uniformly coated with a congealing liquid (30 percent by weight aqueous calcium nitrate solution) and heated at 50° C. was dipped in the rubber latex composition by anodic dipping, was immediately pulled out, was heated and vulcanized in an oven at 100° C. for thirty minutes, and thereby yielded a vulcanized sheet 100 μm thick.

The polymer (hydrogenated natural rubber) in the hydrogenated natural rubber latex has a degree of hydrogenation of 99%, a weight-average molecular weight (Mw) of $90 \times 10^4$, and a molecular-weight distribution (Mw/Mn) of 3.0.

Comparative Example 11

To 166.7 parts by weight of a deproteinized natural rubber latex (a solid rubber content of 60 percent by weight) were added 1 part by weight of sulfur pulverized in a ballmill, 0.5 part by weight of zinc oxide, and 1 part by weight of a vulcanization accelerator [a product of Ouchi Shinko Chemical Industrial Co., Ltd. under the trade name of "Nocceler BZ"] to yield a rubber latex composition. An earthenware sheet uniformly coated with a congealing liquid (30 percent by weight aqueous calcium nitrate solution) and heated at 50° C. was dipped in the rubber latex composition by anodic dipping, was immediately pulled out, was heated and vulcanized in an oven at 100° C. for thirty minutes, and thereby yielded a vulcanized sheet 100 μm thick.

The natural rubber in the deproteinized natural rubber latex has a weight-average molecular weight (Mw) of $120 \times 10^4$, and a molecular-weight distribution (Mw/Mn) of 5.7.

Physical Properties Evaluation Test 3

The sheets obtained according to Examples 7 and 8 and Comparative Example 11 were subjected to heat resistance tests and weather resistance tests. The results are shown in Table 3.

Heat Resistance Test

A sample sheet was punched to yield a JIS No. 1 dumbbell test piece (strip 10 mm wide) which was subjected to heat aging in a gear oven at 100° C. for ninety-six hours, the surface of the sheet was observed, and the heat resistance was evaluated according to the following criteria.

Good: No change
Fair: Somewhat tacky surface
Failure: Significantly tacky surface Weather Resistance Test In accordance with JIS K 6259, a sample sheet was punched to yield a JIS No. 1 dumbbell test piece (strip 10 mm wide) which was stretched 50%, was fixed in a dedicate holder, was placed in an atmosphere of 40° C. and an ozone concentration of 50 pphm for ninety-six hours, and cracking caused by ozone was determined.

TABLE 3

| | Example 7 | Example 8 | Comparative Example 11 |
|---|---|---|---|
| Heat resistance | Fair | Good | Failure |
| Weather resistance | Good | Good | Failure |

Good: No change
Fair: A small amount of minute cracks forms
Failure: A large amount of large cracks forms

The invention claimed is:
1. A method for producing a rubber-like elastic article, comprising:
hydrogenating natural polyisoprenoid in the state of latex with hydrogen in the presence of a hydrogenation catalyst in water to obtain a hydrogenated natural polyisoprenoid, and
subjecting a rubber composition comprising said hydrogenated natural polyisoprenoid having a degree of hydrogenation of 95% or more or a modified product thereof to molding/forming accompanied by vulcanization,
wherein said hydrogenated natural polyisoprenoid has a weight-average molecular weight of $83 \times 10^4$ or more and a molecular-weight distribution of 2.0 or more, wherein the catalyst is selected from the group consisting of a homogenous catalyst and a heterogeneous catalyst, wherein the homogenous catalyst is selected from the group consisting of metal salts and metal-containing ionic compounds;

wherein said metal salts and metal-containing ionic compounds are selected from the group consisting of nickel carbonate-trialkylaluminum, palladium chloride, and palladium acetate, and wherein the heterogeneous catalyst is a solid catalyst having $Pd/CaCO_3$ or Pd/C.

2. The method for producing a rubber-like elastic article according to claim 1, wherein the hydrogenated natural polyisoprenoid has a weight-average molecular weight of $90 \times 10^4$ or more and a molecular-weight distribution of 3.0 or more.

3. A method for producing a hydrogenated natural polyisoprenoid latex or a modified product thereof, comprising:

hydrogenating natural polyisoprenoid in the state of latex in the presence of a hydrogenation catalyst in water to obtain a hydrogenated natural polyisoprenoid, and subjecting a rubber composition comprising said hydrogenated natural polyisoprenoid having a degree of hydrogenation of 50% or more or a modified product thereof to molding/forming accompanied by a natural vulcanization, wherein said hydrogenated natural polyisoprenoid latex has a weight-average molecular weight of $60 \times 10^4$ or more and a molecular-weight distribution of 2.0 or more, wherein the catalyst is selected from the group consisting of a homogeneous catalyst and a heterogeneous catalyst, wherein the homogeneous catalyst is selected from the group consisting of metal salts and metal-containing ionic compounds;

wherein said metal salts and metal-containing ionic compounds are selected from the group consisting of nickel carbonate-trialkylaluminum, palladium chloride, and palladium acetate, and wherein the heterogeneous catalyst is a solid catalyst having $Pd/CaCO_3$ or Pd/C.

4. The method according to claim 3, wherein the natural polyisoprenoid latex is a latex derived from *Hevea brasiliensis*, *Ficus elastica*, *Eucommia ulmoides*, or fungus belonging to the genus *Lactarius*.

5. The method for producing a hydrogenated natural polyisoprenoid latex or a modified product thereof according to claim 3, wherein the hydrogenated natural polyisoprenoid has a weight-average molecular weight of $90 \times 10^4$ or more and a molecular-weight distribution of 3.0 or more.

* * * * *

UNITED STATES PATENT AND TRADEMARK OFFICE
CERTIFICATE OF CORRECTION

| | | |
|---|---|---|
| PATENT NO. | : 8,207,386 B2 | Page 1 of 1 |
| APPLICATION NO. | : 10/582000 | |
| DATED | : June 26, 2012 | |
| INVENTOR(S) | : Shinichi Inoue et al. | |

It is certified that error appears in the above-identified patent and that said Letters Patent is hereby corrected as shown below:

ON THE TITLE PAGE:

At item (30), correct the Foreign Application Priority Data to read as follows:

-- Dec. 8, 2003     (JP)   ............... 2003-409476
   Aug. 26, 2004     (JP)   ............... 2004-246954
   Nov. 8, 2004     (JP)   ............... 2004-324229 --.

Signed and Sealed this
Twenty-fifth Day of September, 2012

David J. Kappos
*Director of the United States Patent and Trademark Office*